May 20, 1958

E. L. SCHEIDENHLEM 2,835,098

HARVESTER FOR PUMPKINS AND SIMILAR CROPS

Filed April 4, 1955

INVENTOR.
Earl L. Scheidenhelm
BY
Gruhlvalls
Atty.

May 20, 1958 E. L. SCHEIDENHLEM 2,835,098
HARVESTER FOR PUMPKINS AND SIMILAR CROPS
Filed April 4, 1955 3 Sheets-Sheet 2

INVENTOR.
Earl L. Scheidenhelm
BY
Stuhlwells
Atty.

May 20, 1958  E. L. SCHEIDENHLEM  2,835,098
HARVESTER FOR PUMPKINS AND SIMILAR CROPS
Filed April 4, 1955  3 Sheets-Sheet 3
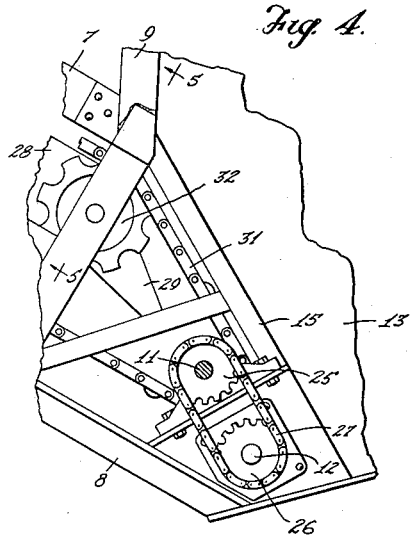
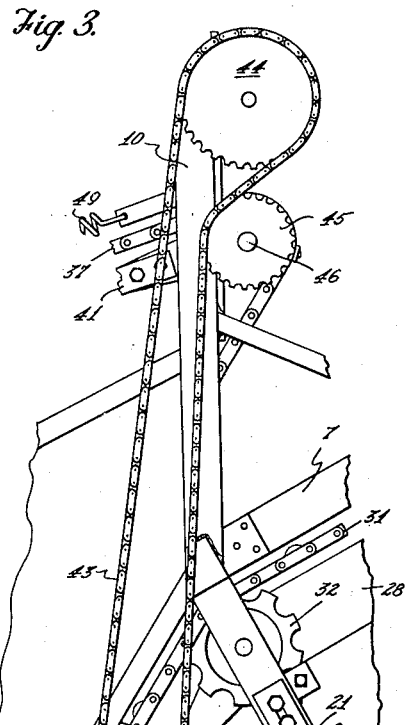
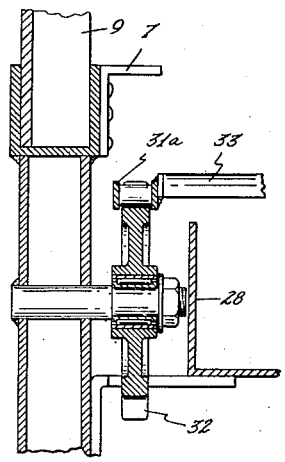
INVENTOR.
Earl L. Scheidenhelm
BY
*Gruhl Wells*
Atty.

United States Patent Office 2,835,098
Patented May 20, 1958

2,835,098

HARVESTER FOR PUMPKINS AND SIMILAR CROPS

Earl L. Scheidenhelm, Mendota, Ill., assignor to Horace D. Hume, Mendota, Ill.

Application April 4, 1955, Serial No. 499,047

3 Claims. (Cl. 56—327)

The present invention relates to a harvester for pumpkins and similar crops.

In harvesting such crops as pumpkins, squash and the like, it is a difficult matter to pick up the crop mechanically and load it without damage. The pumpkins cannot be dropped and they are easily bruised if they are handled with fingers or toothed pickers. It is the purpose of the present invention to provide a harvester for such crops with a pick up mechanism which utilizes only rollers and travelling conveyors and which employs an elevating conveyor that is adapted to ride over the individual pumpkins, etc., and then aid the rollers in lifting them until they can be elevated along a smooth sloping surface for loading. This latter elevation is accomplished by another pusher type conveyor which pushes and rolls the pumpkins up an incline for loading.

The nature and advantages of my invention will appear more fully from the following description and the accompanying drawings wherein a preferred form of the invention is shown. It should be understood, however, that the drawings and description are illustrative only and are not intended to limit the invention except insofar as it is limited by the claims.

In the drawings:

Figure 3 is a fragmentary sectional view taken on the line 3—3 of Figure 2;

Figure 4 is a fragmentary sectional view taken on the line 4—4 of Figure 2;

Figure 5 is an enlarged sectional view taken on the line 5—5 of Figure 4; and

Figure 1:
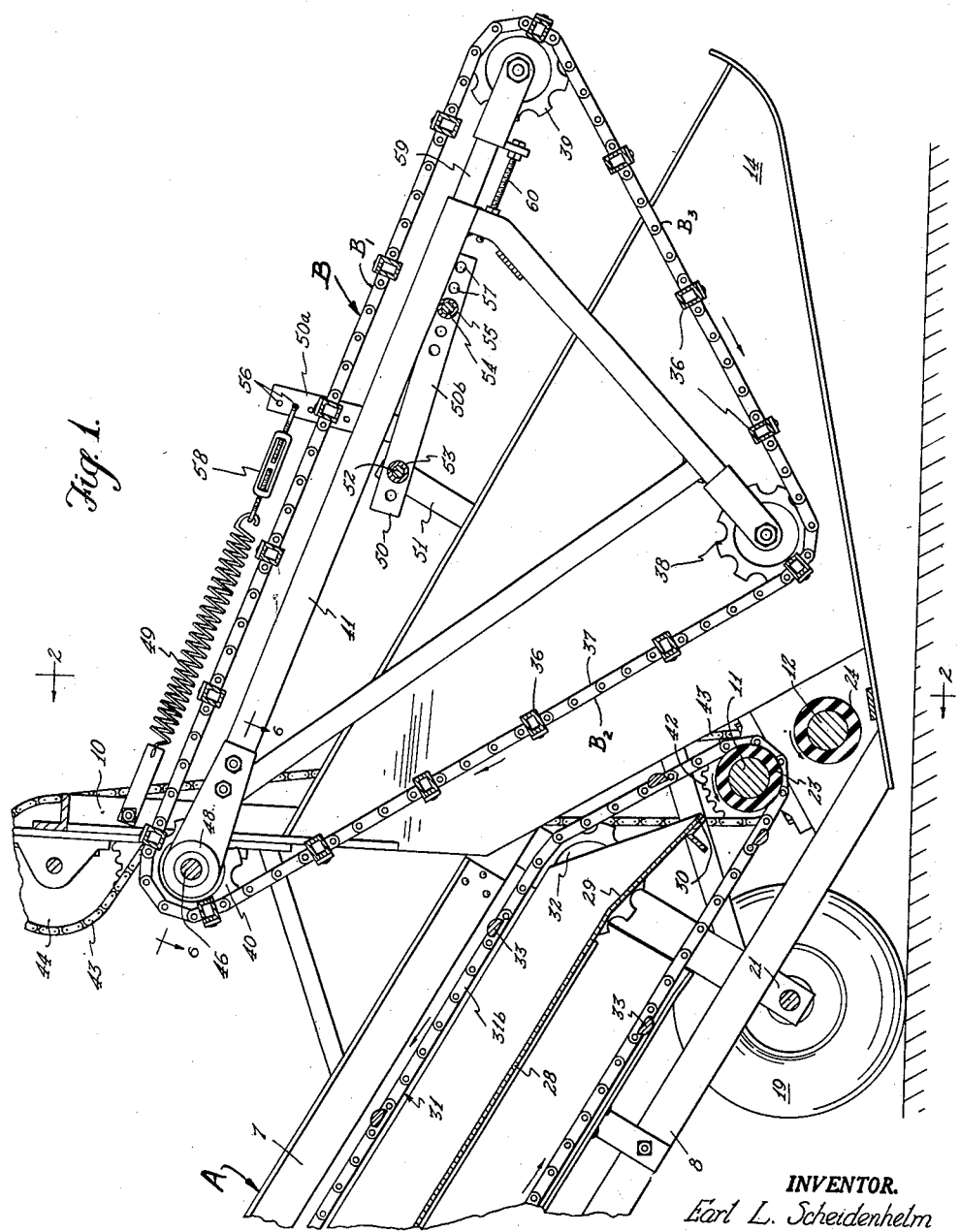
Figure 1 is a sectional view taken longitudinally through the harvester on a vertical plane as indicated by the section line 1—1 on Figure 2.

Referring now in detail to the drawings, the improved harvester comprises a main supporting frame A, including a top portion 7 and a lower portion 8, with upright frame members 9 and 10 at the front of the main frame A. The lower frame members 8 are extended forwardly beyond the uprights to mount an upper roller shaft 11 and a lower roller shaft 12. The shafts 11 and 12 are positioned at the lower front end of the frame A. Side guards 13 and 14 are extended forwardly beyond the frame members just described and are anchored to the uprights 9 and 10 and to auxiliary frame members 15 and 16.

Figure 2:
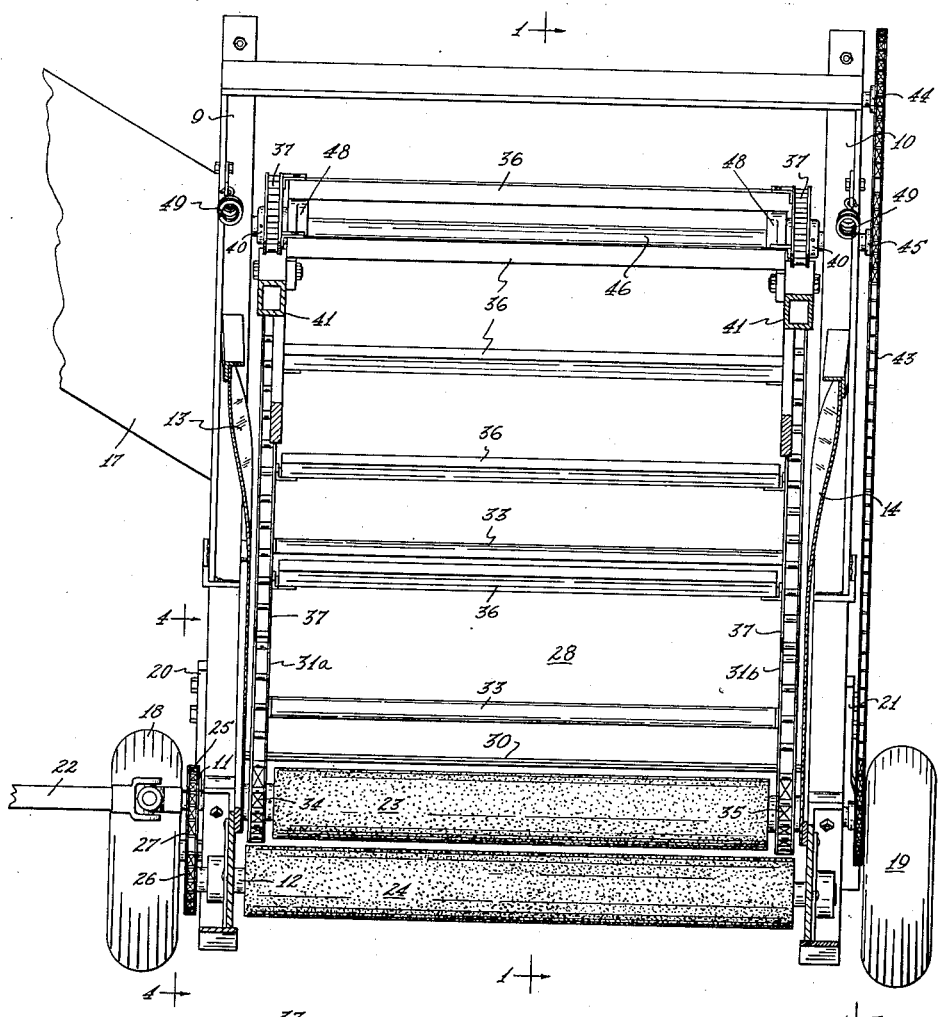
Figure 2 is a sectional view taken on the line 2—2 of Figure 1.

The main frame A made up of the frame members just described is supported at its rear end on an elevator conveyor 17, a portion of which is indicated in Figure 2. The main support for the harvester, however, comprises two wheels 18 and 19 which are adjustably mounted by mounting bars 20 and 21 that are secured upon the main frame A. As shown, these wheels 18 and 19 are set back somewhat from the roller shafts 11 and 12. The device is adapted to be drawn by suitable powered vehicles such as a tractor which is attached to the elevating conveyor 17. The connections to the power vehicle, however, form no part of the present invention and therefore are not shown. The powered vehicle does drive a shaft 22 which provides the power to drive the shaft 11 and the other mechanisms which make up the harvester.

The shafts 11 and 12 have rollers 23 and 24 thereon. The shaft 11 has a sprocket wheel 25 thereon and the shaft 12 carries a sprocket wheel 26. A drive chain 27 connects the sprocket wheels 25 and 26 to transmit driving power to the shaft 12 from the shaft 11 so as to rotate the two rollers 23 and 24 in the same direction. As shown best in Figure 1 of the drawings, there is an inclined trough 28 that extends across the harvester above the frame members 8 and below the frame members 7. This trough 28 has a smooth flat bottom and is inclined slightly downward at 29 so that its lower end 30 is pointed substantially at the center of the roller 23. A conveyor 31 is trained around the roller 23 and up over guide sprocket wheels 32 just outside the trough 28. The conveyor 31 is made up of two side chains 31a and 31b and spaced apart semi-cylindrical cross bars 33. The shaft 11 has two sprocket wheels 34 and 35 at the ends thereof for driving the chains 31a and 31b. The rollers 23 and 24, the trough 28, and the conveyor 31 comprise crop elevating means on the frame A, operable to move crops upwardly and rearwardly from the lower front end thereof.

The rollers 23 and 24 and the conveyor 31 are driven in the direction indicated by the arrows in Figure 1 so as to tend to move the pumpkins, etc. upward onto the trough 28 and upwardly along this trough. However, since the crop being harvested is generally round and smooth, it is necessary to provide some additional means for aiding the crop movement. The rollers 23 and 24 have a rubber cover with a roughened or textured surface. The means for aiding elevation of the crop comprises an elevating conveyor B which is composed of a multiplicity of cross bars 36 which are connected together at their ends by chains 37 which in turn are guided by a plurality of sprocket wheels 38, 39 and 40 that are mounted in a position to form a triangular outline by a framework 41. The bars 36 and chains 37 and the supporting and guiding elements 38—41 comprise the elevating conveyor B which is driven in the direction shown from the shaft 11 so as to tend to move the pumpkins, etc. upwardly over the rollers 23 and 24. The conveyor B, as best shown in Figure 1, comprises three flights, an upper flight $B_1$, a first lower flight $B_2$ extending forwardly and downwardly from the main frame A in front of the rollers 23 and 24, and a second lower flight $B_3$ extending forwardly and upwardly from the lower terminus of the flight $B_2$.

Figure 6:
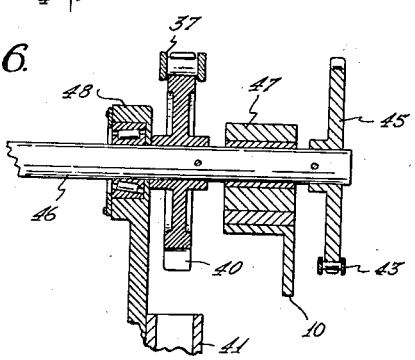
Figure 6 is a fragmentary sectional view taken on the line 6—6 of Figure 1.

The driving mechanism for the elevating conveyor B just described comprises a sprocket wheel 42 on the end of the shaft 11 most remote from its connection to the power take off shaft 22. The sprocket wheel 42 drives a sprocket chain 43 which extends up over a reversing idler sprocket 44 which is mounted at the top of the upright 10. A sprocket wheel 45 is mounted on a shaft 46 that carries the sprocket wheels 40. The shaft 46 is supported by bearings 47 on the uprights 10 and 11. Sprocket wheels 40 and 45 are fixed to the shaft 46 but the framework 41 is journalled on the shaft 46 as indicated by the bearings 48 in Figures 1, 2 and 6.

The crop being harvested varies a great deal in size so the elevating conveyor B must be able to rise up and down readily in order to ride over the crop without damage. The pivotal mounting of the framework 41 by the bearings 48 permits the elevating conveyor B to move up and down. The weight of the elevating conveyor B is counter balanced by spring units 49 and bellcrank levers 50. The levers 50 are pivoted on upright posts 51 which are mounted on the side guards 13 and 14. Figure 1 of the drawings shows the spring unit 49, the bellcrank 50 and the post 51 at one side of the machine. These parts are duplicated at the other side of the machine as will be readily understood. The bellcrank 50 each comprise an upright arm 50a to the bottom of which is secured a horizontal arm 50b. The bellcrank levers 50 are pivoted on a connecting rod 52 which extends between the posts 51. A spacing tube 53 on the rod 52 holds the bellcrank levers 50 spaced apart. The two bellcrank members 50 are also connected by a rod 54 which is supported between the forward ends of the horizontal arms 50b and are held spaced apart by a tube 55 on the rod 54. The rod 54 and its tube 55 extend beneath the uppermost member of the framework 41 and support the framework 41 near the front end thereof between the bellcranks 50.

It will be noted that the bellcrank lever 50 has a plurality of apertures 56 in its upright arm 50a so that the spring unit 49 can be connected at different distances from the pivot point of the lever 50. Likewise a plurality of apertures 57 are provided in the horizontal arm 50b of the bellcrank lever 50 so as to change the position of the rod 54. This mechanism provides adequate adjustment for the proper balancing of the elevating conveyor B by the spring units 49. These spring units 49 also include adjusting turnbuckles 58 in their connection to the upright members 50a for fine adjustment of the balance of the elevating conveyor B. The elevating conveyor chains 37 are kept properly taut by providing the sprockets 39 with supports 59 that telescope into the top member of the framework 41. Adjusting bolts 60 are used to hold the supports 59 in the proper position.

The operation of the harvester just described is believed to be evident from the foregoing description. The speed at which the rollers 23 and 24 and the conveyor units are driven is not particularly critical, although it is desirable that the elevating conveyor B composed of the cross bars 36 and the chains 37, have a speed which is very close to the ground speed at which the harvester moves over the field. Practically it has been found that a slightly higher speed than the ground speed is desirable for this conveyor B so that it may move the crop slightly toward the roller 24. The two rollers 23 and 24 are driven at the same peripheral speed but the speed of the conveyor 31 is somewhat less than the linear speed of the chains 37. Thus the rollers 23 and 24 and the conveyor 31 are travelling at a slower speed than the bars 36 so that if a pumpkin is started up between the bars 36, they will tend to roll the pumpkins upward onto the rollers 24 and 23 and on into the trough 28. The triangular crop elevating conveyor B being carefully balanced, will drop down between pumpkins as they lie in the field and keep them from rolling forward as the rollers 24 move into engagement with them. Once the rollers 24 and one of the bars 36 have a pumpkin between them, they both tend to pick up the pumpkin and move it along to the roller 23 and into the trough 28. The bars 33 of the conveyor 31 will then move the pumpkins up the inclined trough 28.

The members 7—10 inclusive comprise a main supporting frame A which has a lower front end in which the rollers 23 and 24 are journalled. This frame inclines upwardly and rearwardly from the lower front end. The principal supports for the frame are the wheels 18 and 19. The drive means for the rollers 23 and 24 rotate them so that their most forward surfaces move upward, that is, in a direction tending to lift crops engaged by the rollers. The conveyor 31 and the trough 28 together with the roller 23 comprise means to move the pumpkin or other crop upwardly and rearwardly after it is picked up by the roller 24 and the conveyor B composed of the members 36—41. The springs 49, levers 50 and cross members 54—55 provide a spring counterbalance mechanism that supports this conveyor B for movement up and down about its pivotal mounting to the main frame.

The conveyor B is so positioned that its first lower flight B₂ moves upwardly and rearwardly adjacent to the lower front end of the main frame A and spaced therefrom. With this construction, any pumpkin or other similar object which lies between the crossbars 36 will be brought into engagement with the rollers 23 and 24 and lifted by the interaction of the first lower flight B₂ of the conveyor B and the rollers 23 and 24. Since the conveyor B is supported by the spring tensioned bellcrank levers 50 in a counterbalanced fashion, it will engage and hold pumpkins without injury to them. By adjusting the speed of the conveyor B with respect to the ground speed of the machine, the conveyor B may be made to merely hold the pumpkins from rolling forward while the machine advances toward them, or it may be made to move the pumpkins rearwardly over the ground toward the advancing machine.

It is believed that the nature and advantages of my invention appear clearly from the foregoing description.

Having thus described my invention, I claim:

1. A harvester for pumpkins and similar crops comprising an inclined elevating trough having a front lower end, a frame supporting the trough, wheels supporting the frame for travel over the ground, an endless conveyor supported on said frame comprising spaced cross bars and endless flexible members connecting them, said conveyor having an upper flight moving upward over the trough, a roller rotatably mounted at the lower front end of the main frame and adjacent the lower front end of the trough, said roller being exposed at the front of the frame whereby to engage and lift crops contacted thereby, a second endless conveyor pivotally mounted on the frame and extending in front of and in part overlying the first named conveyor, said second conveyor having a lower flight moving upward and rearwardly, and a spring counterbalance mechanism supported on the frame and supporting the second endless conveyor for movement up and down about its pivotal mounting on the frame.

2. A harvester for pumpkins and similar crops comprising an inclined elevating trough having a front lower end, a frame supporting the trough, wheels supporting the frame for travel over the ground, an endless conveyor supported on said frame comprising spaced cross bars and endless flexible members connecting them, said conveyor having an upper flight moving upward over the trough, a shaft journalled in the frame adjacent to and in front of said lower front end of the trough, a roller fixed on said shaft, said endless conveyor extending around the roller and having driving connection with said shaft, a second shaft journalled in the frame adjacent to and below and forwardly of the roller and drivingly connected to the first named shaft, a roller fixed on said second shaft said second roller being exposed at the front of the frame whereby to engage and lift crops contacted thereby, a second endless conveyor pivotally mounted on the frame and extending in front of and in part overlying the first named conveyor, said second conveyor having a lower flight moving upward and rearwardly, and a spring counterbalance mechanism supported on the frame and supporting the second endless conveyor for movement up and down about its pivotal mounting on the frame.

3. A harvester for pumpkins and similar crops comprising an inclined elevating trough having a front lower end, a frame supporting the trough, wheels supporting the frame for travel over the ground, an endless conveyor supported on said frame comprising spaced cross bars and endless flexible members connecting them, said conveyor having an upper flight moving upward over the trough, a shaft journalled in the frame adjacent to and in front of said lower front end of the trough, a roller fixed on said shaft, said roller being exposed at the front of the frame whereby to engage and lift crops contacted thereby, said endless conveyor extending around the roller and having driving connection with said shaft, a second endless conveyor pivotally mounted on the frame and extending in front of and in part overlying the first named conveyor, said second conveyor having a lower flight moving upward and rearwardly, and a spring counterbalance mechanism supported on the frame and supporting the second endless conveyor for movement up and down about its pivotal mounting on the frame.

References Cited in the file of this patent

UNITED STATES PATENTS

| | | |
|---|---|---|
| 875,024 | Wheeler | Dec. 31, 1907 |
| 973,892 | Teeter | Oct. 25, 1910 |
| 1,081,124 | Kulhanek | Dec. 9, 1913 |
| 1,295,520 | Kepler | Feb. 25, 1919 |
| 1,320,249 | Liggett | Oct. 28, 1919 |
| 1,420,118 | McAllister | June 20, 1922 |
| 1,573,125 | Robbins | Feb. 16, 1926 |
| 2,208,128 | Holbrook et al. | July 16, 1940 |
| 2,335,924 | Elholm | Dec. 7, 1943 |
| 2,516,769 | Hadden | July 25, 1950 |

FOREIGN PATENTS

| | | |
|---|---|---|
| 502,513 | Germany | July 17, 1930 |